US006273979B1

(12) United States Patent
Lastoria

(10) Patent No.: US 6,273,979 B1
(45) Date of Patent: Aug. 14, 2001

(54) MOSAIC COLLAGE

(76) Inventor: Ester E. Lastoria, P.O. Box 1118, Manomet, MA (US) 02345

(*) Notice: Subject to any disclaimer, the term of this patent is extended or adjusted under 35 U.S.C. 154(b) by 0 days.

(21) Appl. No.: 09/448,454

(22) Filed: Nov. 24, 1999

(51) Int. Cl.[7] .............................. B32B 31/00; B44C 1/16

(52) U.S. Cl. ............................ 156/63; 156/263; 156/267; 156/297; 428/39; 434/96

(58) Field of Search ............................ 156/63, 256, 263, 156/267, 297, 299; 434/96, 98, 81, 85; 206/575; 428/39

(56) References Cited

U.S. PATENT DOCUMENTS

| | | | |
|---|---|---|---|
| 523,387 | 7/1894 | Tournel . | |
| 1,941,518 | 1/1934 | Twichell . | |
| 2,267,672 | 12/1941 | Volmart . | |
| 2,881,546 | 4/1959 | Gauthier . | |
| 3,002,309 | 10/1961 | Snyder . | |
| 4,777,067 | 10/1988 | Woronow . | |
| 4,912,850 | 4/1990 | Gray . | |
| 4,940,153 * | 7/1990 | Pilgrim, Jr. | 156/63 |
| 5,106,305 * | 4/1992 | Grant | 434/96 |

* cited by examiner

*Primary Examiner*—Jeff H. Aftergut
(74) *Attorney, Agent, or Firm*—John P. McGonagle

(57) ABSTRACT

A method for making a combination mosaic and collage. A sketched composite picture or decorative design on museum board, sealed wood surface, or a flat primer painted surface is made. A combination of overlapped pasted fragmented, photographic pieces is fixed on paper. The combination is then copied on a color copier machine. The resulting material is then fragmented, pasted and set into the sketched composite picture or decorative design. A collage is then assembled or fixed onto the mosaic's composite picture or decorative design.

10 Claims, 6 Drawing Sheets

MOSAIC COLLAGE

BACKGROUND OF THE INVENTION

This invention relates to mosaics and collages, and in particular, to a new method for making a combination mosaic and collage.

It is known in the prior art to provide a customized photograph collage, which is constructed of a plurality of pictures separately mounted and joined together to form a unitary three dimensional collage. It is also known in the prior art to produce a composite picture in one of several colors by applying cut out portions of the picture to a base.

A collage is a technique of composing a work of art by pasting on a single surface various materials not normally associated with one another, as newspapers clippings, parts of photographs, theater tickets and fragments of an envelope. A mosaic is a picture or decoration made of small, usually colored pieces of inlaid stone, glass, etc. The present invention combines the techniques of both in forming a work of art or decoration.

SUMMARY OF THE INVENTION

In the method of the present invention a mosaic is prepared. A sketched composite picture or decorative design on museum board, sealed wood surface, or a flat primer painted surface is made. A set and/or combination of overlapped pasted fragmented, pre-existing photographic pieces or whole photographic pictures is fixed/attached on paper. The set and/or combination is then copied on a photographic color and/or copier machine. The set and/or combination may be enlarged, multiplied, or reduced on photographic paper. The resulting material is then fragmented, pasted and set into the sketched composite picture or decorative design. A collage, i.e., an assemblage of images or objects, is then assembled or fixed onto the mosaic's composite picture or decorative design. If the work is done on a museum board, the finish work is generally dry mounted on the board and a varnish applied for preservational purposes. If the work is done on sealed wood, a plastic polymer is imbued on the surface. The mosaic-collage may be two- or three-dimensional depending on the material or object that is used or incorporated into the work.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
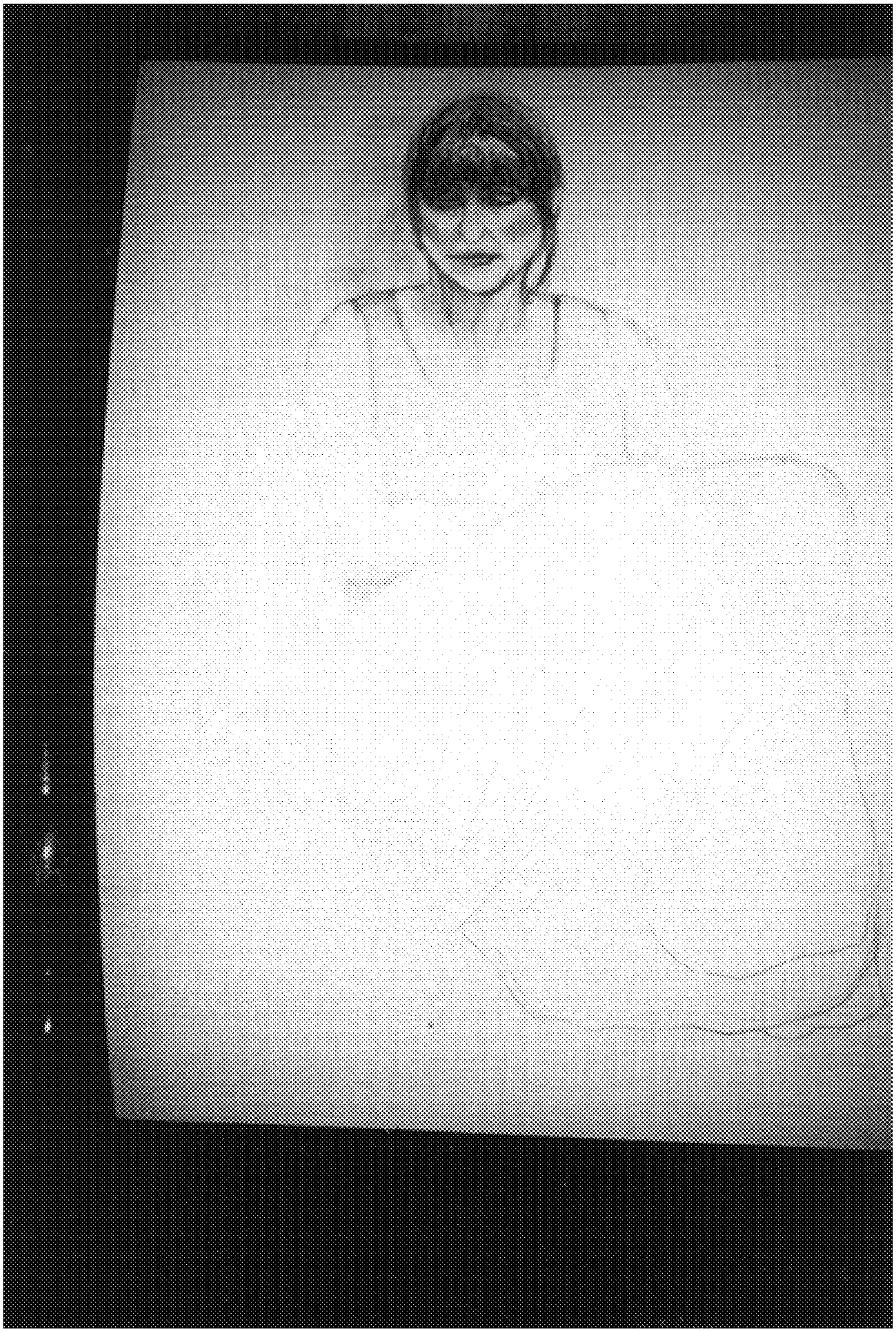
FIG. 1 is a sketch drawing of a sitting woman.
Figure 2:
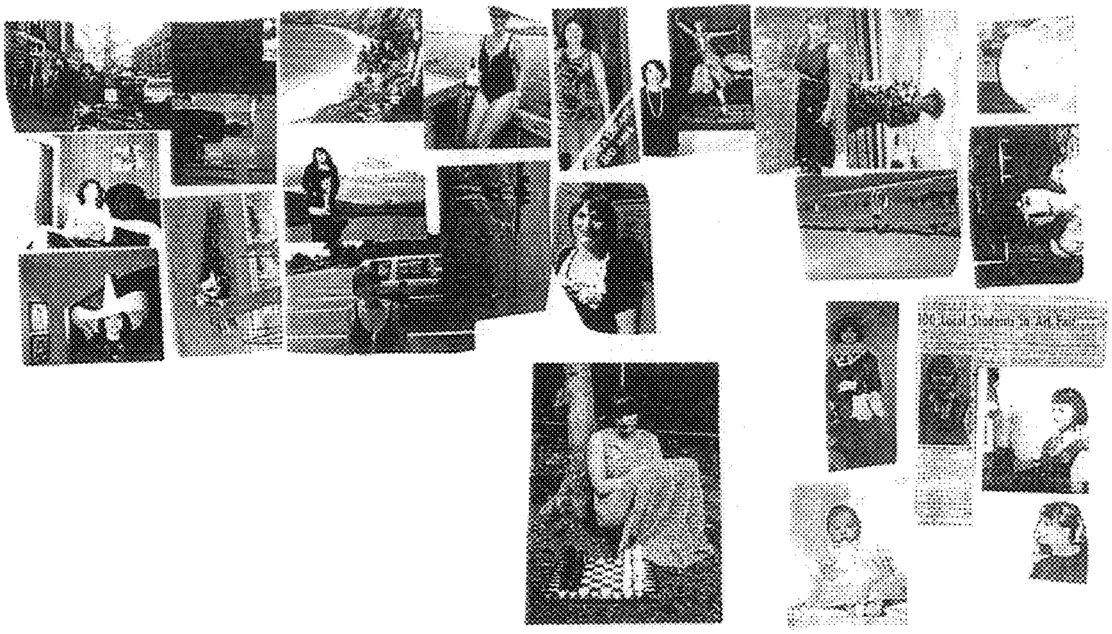
FIG. 2 is an illustration of multiple photographs attached to various sheets of paper.
Figure 3:
FIG. 3 is an illustration of the photo pieces being set onto the surface of the sketch drawing.
Figure 4:
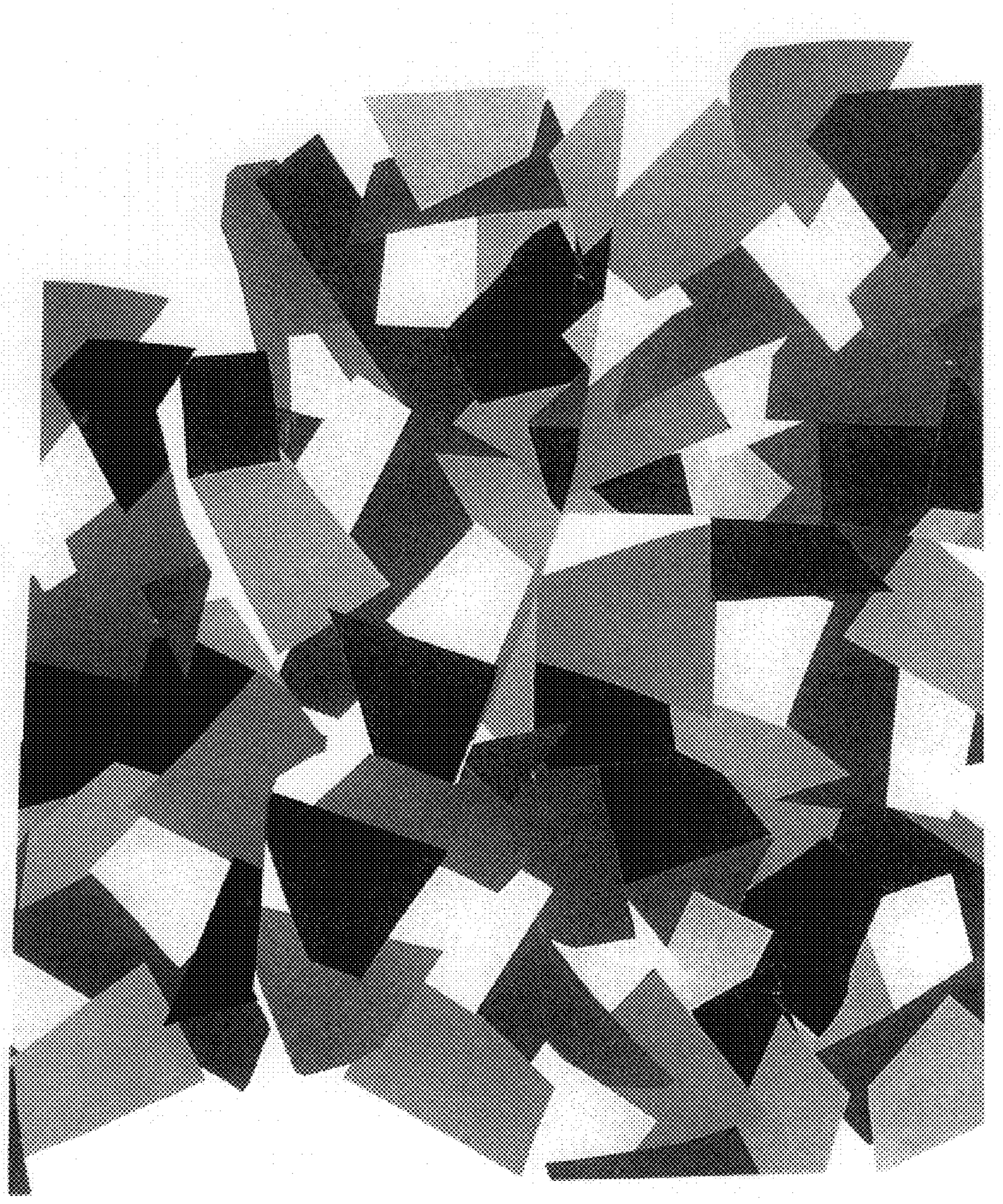
FIG. 4 is an illustration of a sample sheet of material.
Figure 5:
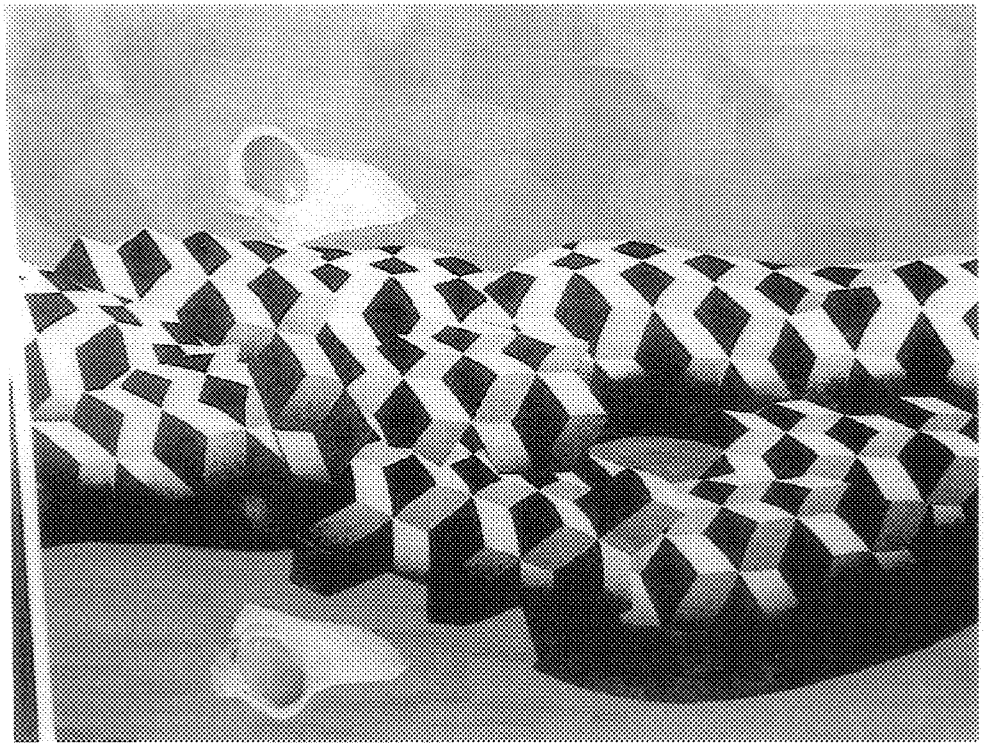
FIG. 5 is a picture of the image "Sunrise, Sunset".
Figure 6:
FIG. 6 is an illustration of a completed mosaic collage.

Referring to the drawings in detail wherein like elements are indicated by like numerals, there is shown a series of steps illustrating an example of the method of the present invention. The first step comprises dry mounting a museum board on a foam backing. A sealed wood surface or a flat primer painted surface may also be used. The next step comprises the preparation and execution of a sketch drawing on the museum board. In this example the sketch drawing is of a sitting woman. The woman is wearing a full-length, sleeveless dress. See FIG. 1. In the next step whole photographic pictures with taped backing are fixed to various sheets of paper to preserve the originals. The sheets with photographs attached are then copied on a photographic color and/or copier machine. The sheets may be enlarged, multiplied or reduced, if the artist so desires. See FIG. 2. The copied whole photo pictures are then fragmented and pasted. Fragmented means that the copied photo pictures are cut into different shapes, portions, etc. The photo pieces are then set onto the sketched drawing by hand and imagination. In this case the photo pieces comprise the sketched character's skin surface. See FIGS. 3 and 6. A number of various sheets of material are copied on a photographic and/or copier machine. The sheets of material may vary with respect to color and/or texture. As with the photographs, the material sheets may be enlarged, multiplied or reduced, if the artist so desires. The copied sheets of material are then fragmented and pasted. The material pieces are then set onto the sketched surface, pasted side first. In this example, the material pieces are being used for dress material and for background sky material. See FIGS. 4 and 6. The artist then made a multiple copies one particular image. See FIGS. 5 and 6. The copied image sheets were then fragmented and pasted. The image pieces were then set around the sketched drawing surface, pasted side first. In this example, the image pieces are being used to represent the non-sky background.

The artist may make further additions to the work using the above techniques. For example, in another step, a black tree is added to the sketch drawing to provide an object against which the sitting woman is leaning. The black tree was made with black copier paper which has been fragmented. Silhouettes of the woman's two sons have been added to the tree surface by pasting fragmented pieces to the mounted surface. See FIG. 6. The artist then added a photo copied image of a pair of scissors by cutting, reconstructing and pasting them near to the bottom of the tree where the woman is looking. See, also FIG. 6. The finished work is dry mounted if done on museum board and a varnish applied to preserve the work. The work may then be framed with a plexiglass that has ultra violet protection. If the work is done on sealed wood, a plastic-polymer is imbued on the surface.

It is understood that the above-described embodiment is merely illustrative of the application. Other embodiments may be readily devised by those skilled in the art which will embody the principles of the invention and fall within the spirit and scope thereof. For example, in the example shown above the particular customized, mosaic-collage shown is two dimensional. However, depending upon the material or objects that are being used or incorporated into the work, three dimensional effects may be realized.

I claim:

1. A method for making a combination mosaic and collage work, comprising the steps of:

dry mounting a museum board on a foam backing;

preparing and executing a sketch drawing on the museum board;

fixing whole photographic pictures with taped backing to various sheets of paper;

copying the sheets with photographs attached on a copier machine;

cutting copies of the sheets with photographs into different shapes;

attaching the cut shapes onto the sketched drawing;

copying sheets of material on a copier machine onto copied sheets of varying color and texture;

cutting the copied sheets into different shapes;

attaching the copied sheets different shapes onto the sketched drawing;

dry mounting said cut copied sheets and photographs on said museum board to form an assembly; and applying varnish to the assembly.

2. The method recited in claim 1, further comprising the step of:

changing sizes of the sheets with photographs attached while copying.

3. The method recited in claim 2, further comprising the step of:

changing sizes of the sheets of material while copying.

4. The method recited in claim 3, further comprising the steps of:

making multiple copies of one particular image;

cutting the multiple copies of said particular image into a variety of shapes; and attaching the variety of image shapes onto and around the sketched drawing.

5. The method recited in claim 4, further comprising the step of:

framing the work with a plexiglass.

6. A method for making a combination mosaic and collage work, comprising the steps of:

preparing and executing a sketch drawing on a piece of sealed wood having a prepared surface;

fixing whole photographic pictures with taped backing to various sheets of paper;

copying the sheets with photographs attached on a copier machine;

cutting copies of the sheets with photographs into different shapes;

attaching the cut shapes onto the sketched drawing;

copying sheets of material on a copier machine onto copied sheets of varying color and texture;

cutting the copied sheets into different shapes;

attaching the copied sheets different shapes onto the sketched drawing;

dry mounting said cut copied sheets and photographs on said piece of sealed wood to form an assembly; and applying varnish to the assembly.

7. The method recited in claim 6, further comprising the step of:

changing sizes of the sheets with photographs attached while copying.

8. The method recited in claim 7, further comprising the step of:

changing sizes of the sheets of material while copying.

9. The method recited in claim 8, further comprising the steps of:

making multiple copies of one particular image;

cutting the multiple copies of said particular image into a variety of shapes; and attaching the variety of image shapes onto and around the sketched drawing.

10. The method recited in claim 9, further comprising the step of:

imbuing said work with a plastic-polymer.

* * * * *